Dec. 10, 1940.   D. A. CUMFER   2,224,810
AIR-CELL PIPE COVERING AND METHOD OF FORMING THE SAME
Filed Nov. 29, 1937    2 Sheets-Sheet 1
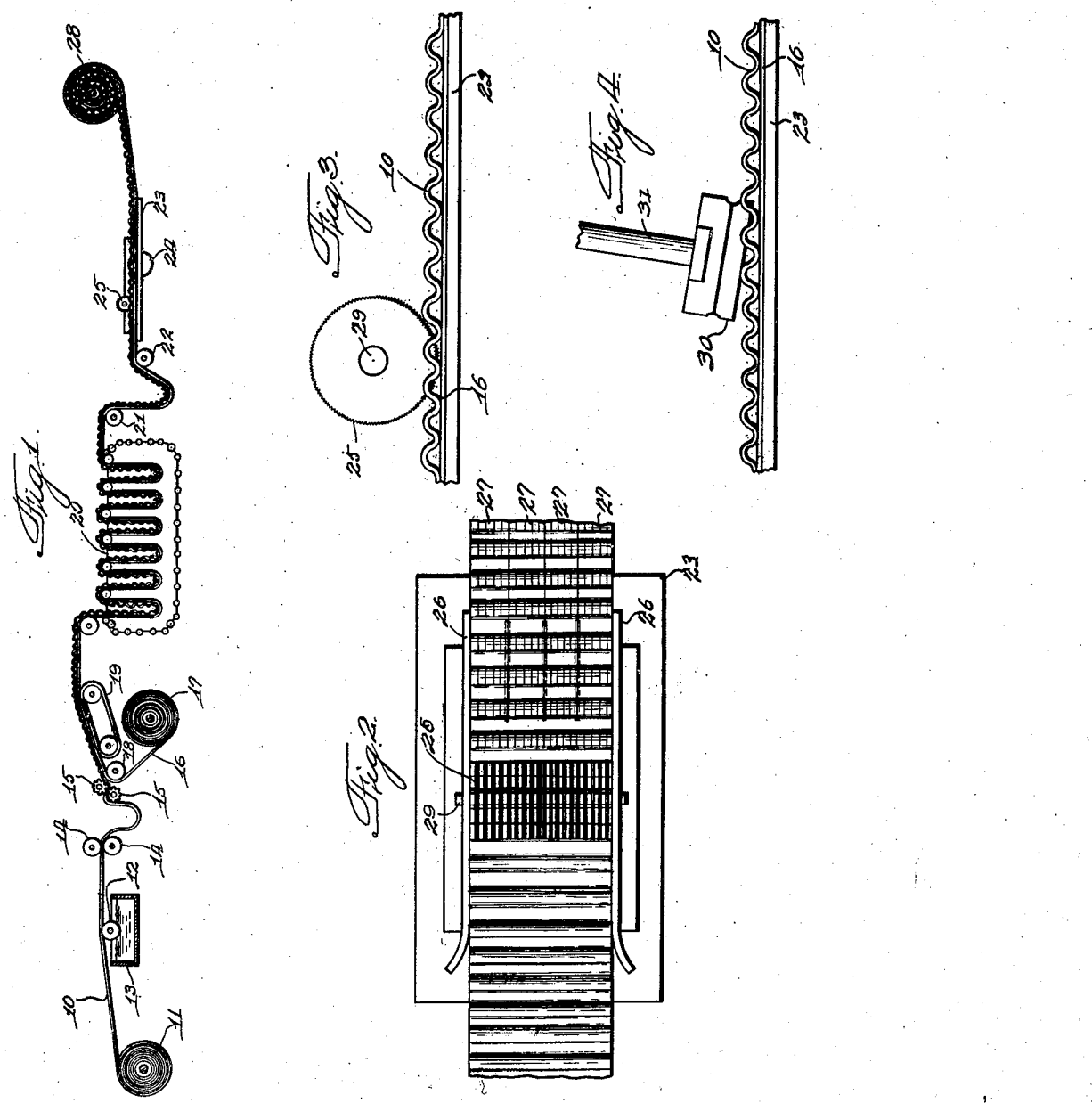

Dec. 10, 1940.                D. A. CUMFER                 2,224,810
         AIR-CELL PIPE COVERING AND METHOD OF FORMING THE SAME
                    Filed Nov. 29, 1937         2 Sheets-Sheet 2
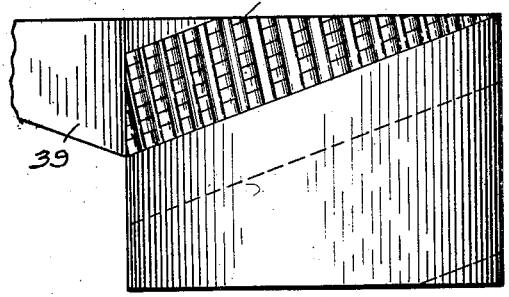
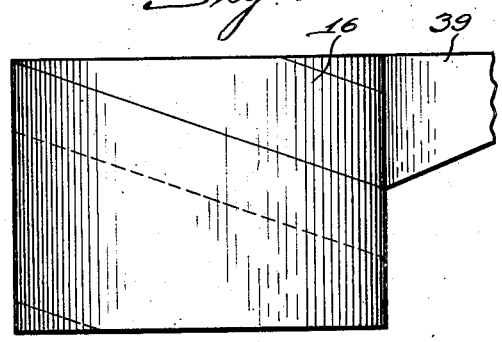
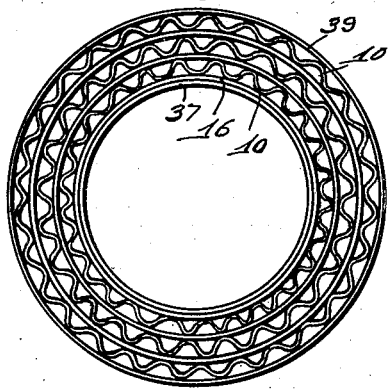
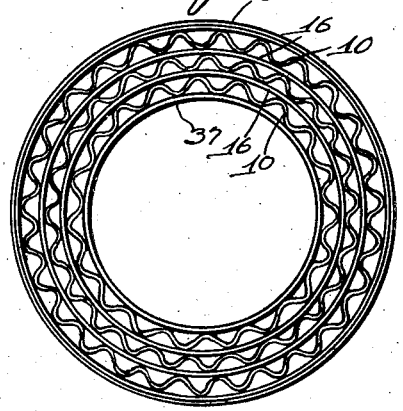
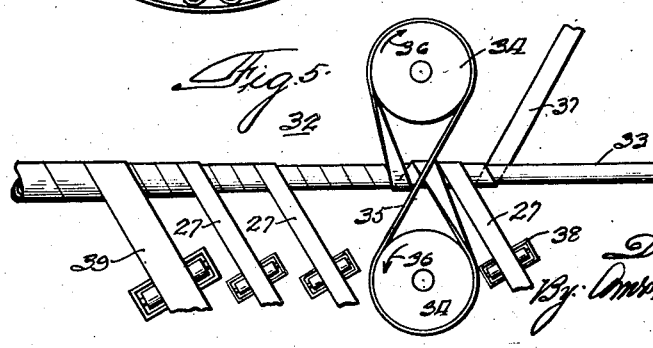

Patented Dec. 10, 1940

2,224,810

UNITED STATES PATENT OFFICE 2,224,810

AIR-CELL PIPE COVERING AND METHOD OF FORMING THE SAME

Donald A. Cumfer, Oak Park, Ill., assignor to United States Gypsum Company, Chicago, Ill., a corporation of Illinois Application November 29, 1937, Serial No. 177,028

12 Claims. (Cl. 154—28)

My invention relates to air-cell pipe coverings and methods of forming the same, more particularly the invention relates to a continuous process of manufacturing air-cell insulating pipe coverings from corrugated asbestos or similar fibrous sheet material, and has for an object the provision of a simple and reliable process and a highly efficient and inexpensive product of this character.

In the past, air-cell pipe coverings of corrugated asbestos or similar sheet materials have been formed through intermittent or batch operations by spirally winding wide sheets of corrugated material on suitable mandrels, an appropriate number of turns or layers being provided to form the desired wall thickness, and the length of the finished tubular product being limited by the width of the sheets used. Such operations are of course time consuming, since the corrugated sheet must be severed and rethreaded each time the product being formed attains the desired wall thickness, and a further objection is found in the limitation of the length of the product formed to the width of the corrugated sheets.

Continuous processes have, of course, been heretofore used in forming tubular bodies from flat strips of fibrous sheet material by helically winding a plurality of the strips in superposed relation on a suitable mandrel to form a continuous tubular element of any desired length, the number of strips used determining the number of layers and the thickness of the wall structure. A continuous element thus formed may of course be severed into desired lengths for use as mailing tubes, container bodies, cores, and in some cases as insulation.

The employment of continuous helical winding processes of this character for forming air-cell pipe insulation from corrugated materials has not been practically feasible in the past due to the fact that such materials are readily flexible only along lines extending longitudinally of the corrugations, the corrugations being substantially non-flexible transversely of their length. It will of course be apparent that in order for a strip to be helically wound the strip must be flexible both longitudinally and transversely in order for the strip to conform to the desired tubular shape unless exceedingly narrow strips are employed. As indicated above, corrugated materials are not ordinarily susceptible of both longitudinal and transverse flexure unless formed of materials which do not have sufficient rigidity or stiffness to be self-sustained. Corrugated asbestos materials of the type referred to above are definitely not of this flexible character, and accordingly difficulties have arisen in attempts to form continuous helically wound corrugated asbestos products.

Prior attempts to solve the problem hereinbefore set forth have involved either the use of extremely narrow strips or have required that the corrugations extend at an oblique angle across the strip, the angle corresponding to the pitch of the helical wind, so that when the strip is wound on a tubular mandrel the corrugations extend parallel to the axis of the tubular structure. While this oblique arrangement of the corrugations eliminates the question of flexure of the corrugations along their length, it is not entirely satisfactory since the pitch of the helical wind varies with the diameter of the tubular mandrel or the structure upon which the strip is wound, unless different width strips are used for each different diameter. Accordingly, a number of different types of strips are required to form multiple layer insulating structures, and in addition considerable difficulty is encountered in forming corrugated strips in which the corrugations extend obliquely with respect to the strip. The use of extremely narrow strips of course complicates the winding operation, slows up the speed of manufacture, and requires an excessive number of joints between adjacent turns or wraps of the strip. Something therefore is yet to be desired in the manufacture of helically wound air-cell insulation products, and it is accordingly a further object of my invention to provide an improved process for continuously manufacturing, on a high speed production basis, helically wound corrugated insulation products of desired length and wall thickness.

In carrying out my invention in one form, a standard sheet of corrugated material is continuously formed by adhesively securing a corrugated sheet to a suitable backing sheet, and this standard material is continuously slit into strips of desired width while the corrugations are deformed at closely spaced intervals to permit flexure of the strip along lines extending transversely of the corrugations, a plurality of such strips being thereafter wound helically to form a continuous tubular structure and the deformations in the corrugations permitting curvature of the strips to conform to the tubular shape. More particularly, the deformation of the corrugations is preferably carried out by slitting the corrugations transversely of their length at closely spaced intervals, the depth of the slits being less than the height of the corrugations so that the backing member is retained as a solid strip.

For a more complete understanding of my invention, reference should now be had to the drawings in which:

Figure 1 is a somewhat diagrammatic view of one form of apparatus suitable for forming corrugated strips embodying the present invention, which strips are adapted to conform to a tubular shape when helically wound;

Fig. 2 is an enlarged diagrammatic plan view of a portion of the apparatus shown in Fig. 1;

Fig. 3 is a fragmentary enlarged elevational view of a portion of the slitting means shown in Figs. 1 and 2;

Fig. 4 is a similar view of a modified form of slitting means;

Fig. 5 is a diagrammatic fragmentary illustration of one form of winding apparatus that may be employed in carrying out my invention;

Fig. 6 is an elevational view of a short section of air-cell pipe covering embodying my invention;

Fig. 7 is an end view of the pipe covering shown in Fig. 6;

Fig. 8 is a view similar to Fig. 6 of a modified form of pipe covering embodying my invention; and Fig. 9 is an end view of the pipe covering shown in Fig. 8.

Referring now to the drawings, although it should be understood that my invention is not limited to the specific embodiment illustrated, I have shown in Fig. 1 one suitable form of apparatus for continuously forming strips of corrugated material which may be employed in forming my improved helically wound pipe coverings. Referring particularly to Fig. 1, a sheet of suitable asbestos or other fibrous material 10 is continuously drawn from a supply roll 11 and passes over an adhesive applying roll 12 which may be of the type well known in the art, and which is shown as partially immersed in a body of adhesive contained within a tank 13, the adhesive preferably being a sodium silicate solution of proper consistency. From the adhesive applying roll 12 the web 10 is progressed through suitable feed rolls 14 and through a pair of cooperating corrugating rolls 15 which are arranged to form the sheet 10 into a corrugated structure in which the corrugations extend transversely of its length.

Simultaneously, a suitable backing sheet 16 which is formed of material similar to the sheet 10, is drawn from a suitable supply roll 17 and is brought into contact with the adhesively coated side of the corrugated sheet 10 by means of a guide roll 18, the two sheets 10 and 16 being then passed over a suitable conveyor 19 to a "looper" apparatus 20 which is of a type well known in the art, and in which the continuously moving composite sheet is dried, the constructional details of the looper being so well known that no further description is believed to be necessary herein.

From the looper apparatus 20 the composite corrugated sheet passes over a pair of feed rolls 21 and 22 to suitable slitting means, here shown as comprising a support or table 23, a plurality of slitting knives 24 which extend upwardly through suitable slots in the support 23 to sever the composite corrugated sheet into strips of desired width, and a plurality of slitting knives 25 which are arranged, as shown best in Figs. 2 and 3, to slit the corrugated sheet 10 at closely spaced intervals, the depth of the slits being less than the height of the corrugations so that the backing sheet 16 is engaged only by the bottom slitting knives 24. Suitable guides 26 are provided for maintaining the composite corrugated sheet in alignment as it passes over the slitting table or support 23, and the individual strips 27 (Fig. 2) are wound onto suitable reels 28 (Fig. 1) as they pass from the slitting table or support 23.

It will thus be seen that I have provided a continuous process for forming a plurality of corrugated strips in which the corrugations extend transversely of the lengths of the strips, and in which all of the corrugations are slit at closely spaced intervals to provide for flexure of the strips along longitudinal lines extending transversely of the corrugations, the slits in the corrugations being of a depth less than the height of the corrugations. In Figs. 1, 2, and 3 the slitting means 25 is shown as comprising a plurality of rotating saws or cutters which are mounted on a suitable shaft 29 and which may be driven by any suitable means, but it will be understood that other slitting means may be provided if desired. Thus in Fig. 4 I have shown the slitting means as comprising simply a plurality of stationary blades 30, only one such blade being shown, the blades being mounted on suitable supporting arms 31 in a position such as to continuously slit the corrugations as the composite corrugated sheet, consisting of the backing sheet 16 and the corrugated sheet 10, is passed therebeneath.

Instead of conducting the corrugated and slit strips 27 to the winding reels 28, the strips 27 may be led through suitable guide and feed rollers directly to the winding device which is preferably of the type shown in Fig. 5. This winding device 32 is of the type well known in the art and heretofore used in the production of helically wound paper tubes, and in order to simplify the drawing only so much of this device is here shown as is necessary for a complete understanding of the present invention. As shown somewhat diagrammatically, the winding device 32 consists of a stationary mandrel 33 which may be of any desired diameter depending upon the size of pipe covering to be formed, and a winding head which comprises a pair of rotatable pulleys 34 for supporting a belt 35 a portion of which is looped around the mandrel. As will be understood by those skilled in the art, rotation of the pulleys or drums 34 in the direction indicated by the arrows 36 is effective to drive the belt in such a manner as to progressively wind on the mandrel 33 strip materials fed to the portion of the mandrel encircled by the belt 35.

In forming my improved pipe covering I prefer to provide first an inner layer of substantially flat sheet material. This inner layer may be formed by feeding to the winding device 32 a flat strip 37, the end of the strip 37 being given a few preliminary turns about the mandrel 33 and the initial end of one of the strips 27 being given a few turns about the strip 37 before the strip 27 is fed under the belt 35. As shown, the flat strip 37 is fed from one side of the mandrel and initially passes beneath the same, while the strip 27 is fed from the other side of the mandrel initially passing over the top thereof. Furthermore, the strip 27 is passed over a suitable adhesive applying means 38 which applies adhesive to the crests of the corrugations on the strip 27 so that the strips 27 and 37, when helically wound upon the mandrel 33, are adhesively secured together.

As will be understood by those skilled in the art, rotation of the pulleys 34 in the direction indicated by the arrows 36 is effective, after the strips 27 and 37 have been properly threaded onto the mandrel as described above, progressively to wind the strips 27 and 37 on the mandrel and continuously to move the tubular structure formed by the strips 27 and 37 along the mandrel 33 from right to left as viewed in Fig. 5.

In order to apply succeeding layers of corrugated material to the tubular structure so as to form a multiple layer structure, additional winding heads may be arranged along the mandrel 33 for successively applying additional helically wound strips 27 to the tubular structure as it is forced along the mandrel. In order to simplify the drawing the additional pulley and belt construction has been omitted, only the additional strips 27 being shown, but it will be understood that each winding head includes suitable pulleys and belts similar to the pulleys 34 and the belt 35. Likewise, it will be understood that the additional winding heads will be so spaced as to apply the additional strips 27 in such a manner that the strips in each helically wound layer are in overlapping relation with the strips forming the next adjacent layers so as to provide a staggered joint arrangement. Although it may not be entirely necessary in some cases, I prefer to complete the tubular structure which forms my improved air-cell pipe covering by applying an outer wrapping 39 which is helically wound onto the outer surface of the tubular structure by a winding head similar to that described above in connection with the first of the strips 27 and the strip 37. In the embodiment shown the strip 39 is somewhat wider than the corrugated strips 27, but the strip 39 may of course be of any suitable width.

Although air-cell coverings embodying my invention may be formed by applying the corrugated strips 27 with the corrugated surfaces thereof facing either inwardly or outwardly, I prefer, as indicated in Fig. 5, to apply the strips with the corrugations facing inwardly. In this arrangement the transverse curvature of the strips by means of which the strips conform to the tubular shape, effects a compacting of the corrugations and substantially closes the slits formed by the cutting knives 25, which slits are necessary to permit this transverse curvature. Thus the short segment of the pipe covering shown in Figs. 6 and 7 includes a plain inner layer 37, three layers of corrugated material each of which is arranged with the corrugated sheet 10 inwardly of the corresponding backing sheet 16, and an outer layer 39. In Figs. 8 and 9 I have shown an air-cell pipe covering embodying my invention in which the corrugated layers are arranged with the corrugated sheets 10 outwardly of the associated backing sheets 16, the outermost one of the corrugated sheets 10 being covered by the outer layer 39. As shown best in Fig. 8 in this embodiment of my invention, the necessary curvature of the corrugated strips to conform to the tubular shape is effective slightly to spread the slits in the corrugations so as to leave slight gaps therein.

A further particular advantage obtained in helically wound pipe coverings embodying my invention is that the corrugations do not extend parallel to the axis of the pipe covering after helical winding, and that accordingly no long straight vertical flues or passageways are formed. Thus the "chimney effect" ordinarily found in pipe coverings, which effect results in considerable heat loss, is eliminated.

Although in the embodiments described above the desired deformation of the corrugations is obtained by slitting the corrugations transversely of their length at closely spaced intervals, I have found that in some cases sufficient flexibility may be imparted to the corrugated material by otherwise deforming the corrugations, as for example by simply cross-corrugating the corrugated sheet 10 at closely spaced intervals. Inasmuch as cross-corrugated material of this general type is at present known in the art together with means for producing the same, it is not believed necessary to further describe or illustrate this embodiment of my invention. It will of course be understood that the tubular structures formed in accordance with my invention may be slit axially along any side to permit application of the insulating coverings to pipes to be insulated.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. The method of forming air-cell pipe coverings from strips of corrugated material bendable only along lines parallel to said corrugations, which method comprises deforming said corrugations at closely spaced intervals along the length thereof, and winding said strips helically to form a tubular structure, the deformations in said corrugations providing for curvature of said strips longitudinally of said corrugations to conform to said tubular shape.

2. The method of forming air-cell pipe coverings which comprises transversely corrugating a strip of fibrous material, deforming the corrugations at closely spaced intervals along the length thereof to provide for transverse flexure of said corrugated strip, and wrapping said corrugated strip helically to form a tubular insulating structure, said deformations of said corrugations providing for transverse curvature of the strip to conform to the tubular shape.

3. The method of forming air-cell pipe coverings which comprises transversely corrugating a strip of fibrous material, adhesively securing thereto a backing strip of similar material to form a composite corrugated strip, slitting the corrugations longitudinally of said composite strip at closely spaced intervals to provide for transverse flexure of said composite corrugated strip, said slits having a depth less than the height of said corrugations, and wrapping said composite strip helically to form a tubular insulating structure, said slits providing for transverse bending of said corrugated strip to conform to said tubular shape.

4. The method of forming air-cell pipe coverings from corrugated material including a corrugated face sheet and a flat backing member secured thereto, which method comprises longitudinally slitting a strip of said material having the corrugations extending transversely thereof, the depth of said slits being less than the height of said corrugations, and winding said strip helically to form a tubular insulating structure, said slits providing for transverse curvature of the corrugated strip to conform to said tubular shape.

5. The method of forming air-cell pipe coverings from strips of corrugated material the corrugations therein lying transversely of the strip and said material being bendable only along lines transverse to the length of the strips, which method comprises transversely slitting said corrugations to a depth less than the height thereof, and winding said strips helically to form a tubular structure, said slits providing for curvature of said strips longitudinally of said corrugations to conform to said tubular shape.

6. The continuous process for forming air-cell pipe coverings from strips of corrugated material the corrugations therein lying transversely of the strip and said material being flexible only along lines transverse to the length of the strips, which process comprises transversely slitting said corrugations to a depth less than the height thereof, winding said strips helically to form a continuous tubular structure, said slits providing for curvature of said strips longitudinally of said corrugations to conform to said tubular shape, and severing said continuous tubular structure into predetermined lengths.

7. The continuous process for forming air-cell pipe coverings from strips of corrugated material the corrugations therein lying transversely of the strip and said material being flexible only along lines transverse to the length of the strips, which process comprises transversely slitting said corrugations to a depth less than the height thereof, helically winding a plurality of said strips one upon the other to form a continuous multiple layer structure of tubular shape, said slits providing for curvature of said strips longitudinally of said corrugations to conform to said tubular shape, and severing said continuous tubular structure into pipe coverings of predetermined lengths.

8. An air-cell, insulating, pipe covering comprising a helically wound strip of corrugated material having the corrugations extending transversely of the strip, said corrugations being deformed transversely of their length at closely spaced intervals to permit curvature of said strip longitudinally of said corrugations whereby a tubular structure having uniformly curved corrugations extending angularly with respect to the axis thereof is formed.

9. An air-cell, insulating, pipe covering comprising a strip of transversely corrugated material helically wound to form a tubular structure, said corrugations being slit transversely of their length at closely spaced intervals to permit curvature of said strip longitudinally of said corrugations whereby said strip forms said tubular structure, said slits extending to a depth less than the height of said corrugations.

10. An air-cell, insulating, pipe covering comprising a tubular structure having a plurality of layers, each of said layers consisting of a strip of transversely corrugated material helically wound to form a continuous layer, said strips being wound in overlapping relation with the strips forming the next adjacent layers, and said corrugations being slit transversely of their lengths at closely spaced intervals to permit curvature of said strips longitudinally of said corrugations.

11. An air-cell, insulating, pipe covering comprising a helically wound asbestos strip forming a continuous tubular layer, said asbestos strip consisting of a corrugated face member adhesively secured to a flat backing member, said corrugated face member being slit transversely of the length of the corrugations at closely spaced intervals, to permit curvature of said helically wound strip longitudinally of the corrugations.

12. An air-cell, insulating, pipe covering comprising a tubular structure having a plurality of layers, each of said layers consisting of a helically wound composite strip having an asbestos facing member corrugated transversely of the length thereof and adhesively secured to a flat backing member of similar material, said composite strips being wound in overlapping relation with the strips forming the next adjacent layers, and said transverse corrugations being slit transversely of their length to permit curvature of said helically wound composite strips longitudinally of said corrugations.

DONALD A. CUMFER.